United States Patent [19]

Stratford et al.

[11] Patent Number: 4,550,745
[45] Date of Patent: Nov. 5, 1985

[54] DEVICE FOR DISCHARGING A MIXTURE OF TWO LIQUIDS

[75] Inventors: Michael G. Stratford; Harry C. Spencer-Watkins, both of Tring, England

[73] Assignee: Burroughs Wellcome Co., Research Triangle Park, N.C.

[21] Appl. No.: 454,417

[22] Filed: Dec. 29, 1982

[30] Foreign Application Priority Data

Jan. 5, 1982 [GB] United Kingdom ............... 8200131
Aug. 12, 1982 [GB] United Kingdom ............... 8223186

[51] Int. Cl.$^4$ ........................................... G05D 11/04
[52] U.S. Cl. .................................. 137/99.5; 137/121
[58] Field of Search .................... 137/99, 99.5, 121

[56] References Cited

U.S. PATENT DOCUMENTS

| | | | |
|---|---|---|---|
| 729,286 | 5/1903 | Davidson | 137/99 |
| 2,203,832 | 6/1940 | Malburg | 137/99 |
| 2,221,273 | 11/1940 | Strasburger | 137/99.5 |
| 2,964,052 | 12/1960 | Montagnon | 137/99.5 |
| 3,737,073 | 6/1973 | Lupert | 137/99 X |

FOREIGN PATENT DOCUMENTS 264227 1/1927 United Kingdom .

Primary Examiner—Martin P. Schwadron
Assistant Examiner—Stephen M. Hepperle
Attorney, Agent, or Firm—Donald Brown; Robert T. Gammons

[57] ABSTRACT

This invention relates to a device for the constant replenishment of an animal dipping bath, or for use in any situation where it is desired to have a concentrate diluted with a liquid with little or no liquid supply pressure.

The device consists of a two-component rocking-pan arrangement 8 and 9 for receiving and discharging the mixture and a metering arrangement for discharging concentrate in the pan. The metering arrangement consists of a double acting single piston and cylinder pump, linked to the pan, and comprises a single piston 22, and a single cylinder partitioned by the piston into 2 chambers, 25 and 26 each chamber being capable of receiving and discharging quantities of concentrate. The arrangement of the pump is such that when one chamber is discharging concentrate into the pan the other is receiving concentrate from the supply line, and concentrate is delivered to that one of the two components which is about to be filled with diluent. The device is particularly useful for sheep-dipping purposes.

2 Claims, 4 Drawing Figures

DEVICE FOR DISCHARGING A MIXTURE OF TWO LIQUIDS

The present invention relates to a device for discharging a mixture of two liquids and is particularly but not exclusively concerned with a device for use, for example, in sheep- or other animal-dipping purposes where it is desirable to meter out one liquid and/or to mix it into another liquid.

In dip-replenishment and other similar applications, it is usually desired to dilute a concentrate, the "active ingredient", in water.

One known replenisher device involved the use of a "rocking pan" arrangement. A rocking pan arrangement is a long established device for metering out or measuring a quantity of liquid. It comprises a pan pivotal about a horizontal axis between two stable positions. The pan is divided by a central partition into two compartments which are alternatively filled and emptied, with one compartment being filled as the other empties and vice versa. A filling arrangement discharging the liquid is disposed above the axis of pivoting so that with the pan in one stable position it fills one compartment and, with it in the other stable position, it fills the other. Once a compartment becomes full, this tips the pan over to the position in which that compartment empties and the other is presented for filling.

In the known replenisher device, the rocking pan arrangement discharges into a holding tank and the rocking of the pan is used to operate a piston and cylinder pump which discharges a quantity of the concentrate into the liquid in the holding tank.

According to a first aspect of the present invention there is provided a device for discharging a mixture of two liquids, for example a concentrate and diluent, comprising a rocking-pan arrangement for receiving and discharging one of the liquids and a metering arrangement, preferably operated by the rocking of the pan, for discharging the second liquid into the pan. Preferably, the relationship between the rocking-pan arrangement and the metering arrangement is such that the second liquid is discharged into that one of the two compartments of the pan which is about to be filled by the first liquid. This ensures thorough mixing with the two liquids prior to discharge from the pan.

In a first, preferred aspect of the invention, there is provided a device for discharging a mixture of two liquids, comprising a rocking pan arrangement for receiving and discharging the first liquid and a double acting single piston and cylinder pump, able to receive and discharge the second liquid from chambers at either end of the cylinder, the single piston being operated by the tipping of the pan, such that in one position, one chamber is undergoing a suction stroke while the other is undergoing a discharge stroke. The two strokes are operated in opposition and the amount of work done during each rocking movement of the pan is substantially the same, and this makes for more consistant operation. The pump may be linked to the pan, or a support thereof, at a distance spaced from the axis of pivoting of the pan, so that as the pan tips back and forth, the piston is reciprocated back and forth within the cylinder, and when one chamber is receiving concentrate from the supply line the chamber at the opposite end of the cylinder is discharging concentrate into that one of the two components of the pan which has been presented for filling. Suitably the distance of the point of connection of the pump with the pan (or support), is adjustable, so that the stroke of the cylinder may be adjusted thereby providing for variation in the concentration of the second liquid in the mixture.

Alternatively in a second preferred aspect of the invention the metering arrangement may comprise a pair of pumps to alternately discharge quantities of the second liquid as the pan rocks back and forth.

The pumps may each be a piston and cylinder pump and may each be linked to the pan or a support thereof at a distance spaced from the axis of pivoting of the pan so that as the pan tips back and forth, the two pistons are simultaneously reciprocated back and forth. This alternative preferred aspect has the advantages and characteristics of the first preferred aspect as hereinbefore defined.

As will become apparent from the following description of and illustrated embodiment, the first aspect of the invention and either preferred aspect of the invention may be embodied in a single device.

In the following, the invention will be described with reference to its application to the replenishment of a sheep-dip, it will be appreciated that the present invention has many other applications, as in dips for cattle and indeed any situation where it is desired to have a concentrate diluted with a liquid with little or no liquid supply pressure, e.g. in an indicator, or for neutralizing industrial effluent, etc.

The invention will be further described with reference to the accompanying drawings, in which.

Figure 1:
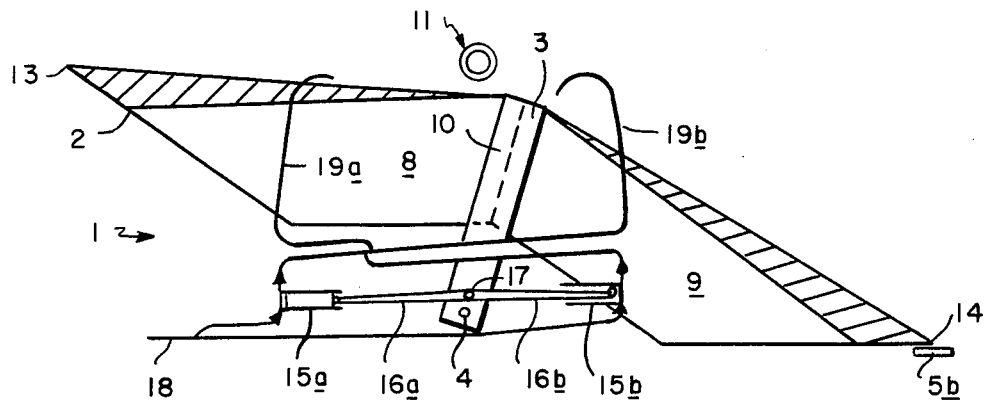
FIG. 1 is a somewhat schematic side view of one embodiment of the present invention.
Figure 2:
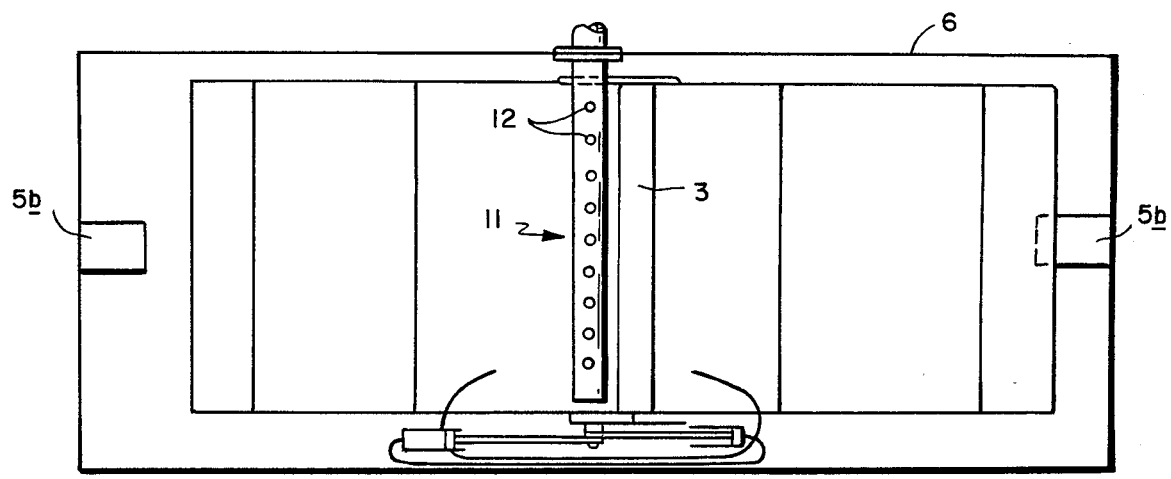
FIG. 2 is a plan view of the embodiment of FIG. 1.

The device 1 shown in FIG. 1 comprises a pan 2 which is rectangular in plan and has a bottom surface conforming generally to the shape of an opened-out "W". The pan is mounted on a pair of supports such as 3 to be pivotable about a horizontal axis at 4. The pan may be rocked back and forth between two stable positions, one being shown in FIG. 1 and the other being its mirror image, the stable positions being defined by two stops 5a and 5b provided extending inwardly from the wall of an e.g. rectangular holding tank 6 into which the device 1 is fitted so as to discharge a mixture of water and sheep-dip concentrate.

The base of the tank 6 may be shaped to direct the sheep-dip solution to flow to a drain, suitably central, incorporating a pipe spigot (not shown) to which a suitable length of pipe may be fitted to conduct the solution to a sheep-dip bath.

As shown in FIG. 1, the interior of the pan 2 is divided into two equal compartments 8 and 9 by means of a partition 10 which extends radially with respect to the axis of pivoting 4. Disposed vertically above the pan, vertically in line with the axis 4 is a horizontally extending water discharge pipe 11 provided along its length with a number of discharge holes 12 from which water enters which ever one of the two compartments 8 and 9 is located below it at any given time. Obviously the operation of the rocking-pan arrangement is that one of the pans fills until the pan overbalances whereupon that compartment descends and empties and the other compartment is presented to the pipe 11 for filling. Preferably the lips 13 and 14 extend sufficiently far away from the axis 4 of the rocking-pan arrangement that water only starts to empty from the compartment when it is towards the end of its descent. This enables the maximum amount of useful work to be extracted from the lowering of the water.

In order to mix the concentrate with the water, two piston and cylinder pumps 15a and 15b are provided, the cylinders of these pumps being interconnected by connecting rods 16a and 16b to a pivot 17 having an horizontal axis parallel to and spaced from the axis 4. By being interconnected in this way, the pistons of the two pumps are reciprocated so that as one is undergoing a suction stroke the other is undergoing a delivery stroke. The two pumps are connected to a common supply line 18 for the concentrate and their outlets are connected to two discharge pipes 19a and 19b which extend above the pan 2 and overhang the respective compartments 8 and 9. The two outlet pipes 19a and 19b are crossed over so that during the delivery stroke of one of the pistons, it delivers concentrate to that one of two compartments 8 and 9 which is just about to be filled.

Figure 3:
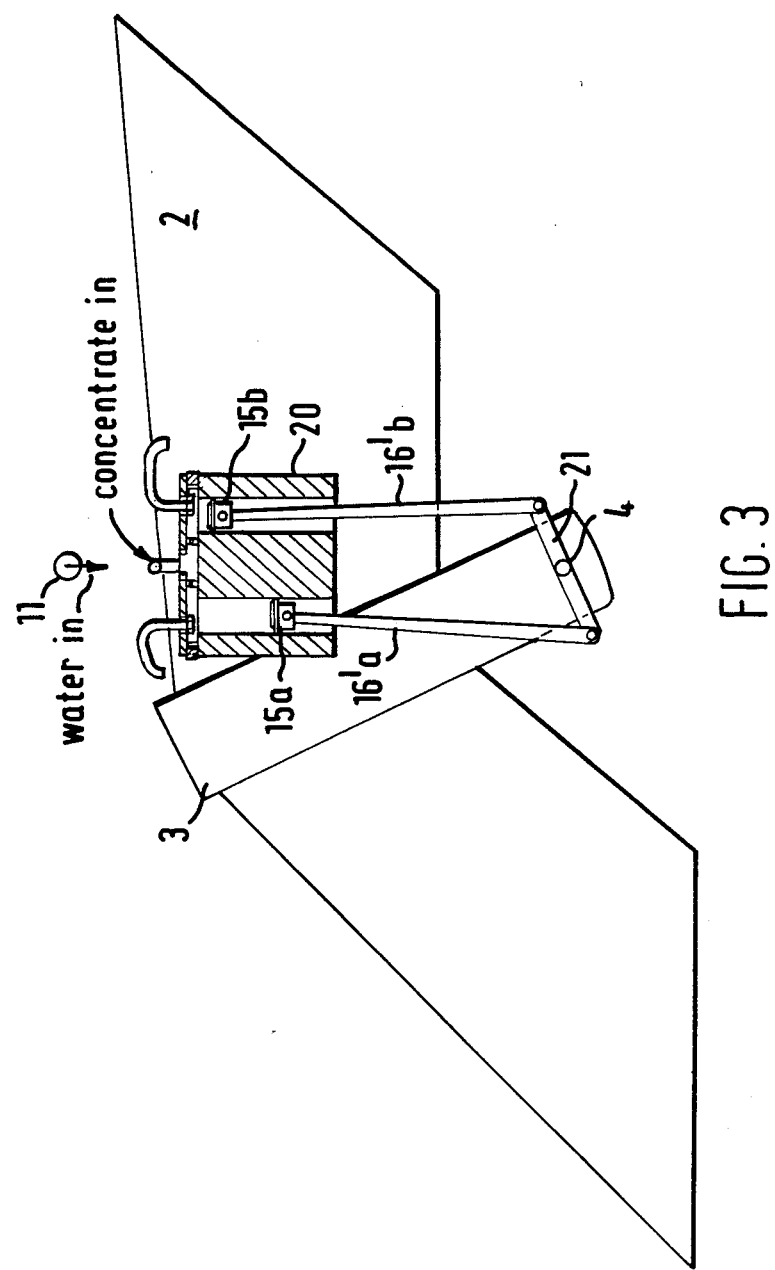
FIG. 3 is a somewhat schematic side view, partly in section, of a further embodiment of the present invention.

FIG. 3 shows an alternative embodiment where the pistons of the pumps 15a and 15b are mounted in a common cylinder block 20 and are connected by two connecting rods 16'a and 16'b to the opposite ends of an arm 21 which is pivoted back and forth about the axis 4 of the device by the rocking of the pan 2 and its support 3.

Figure 4:
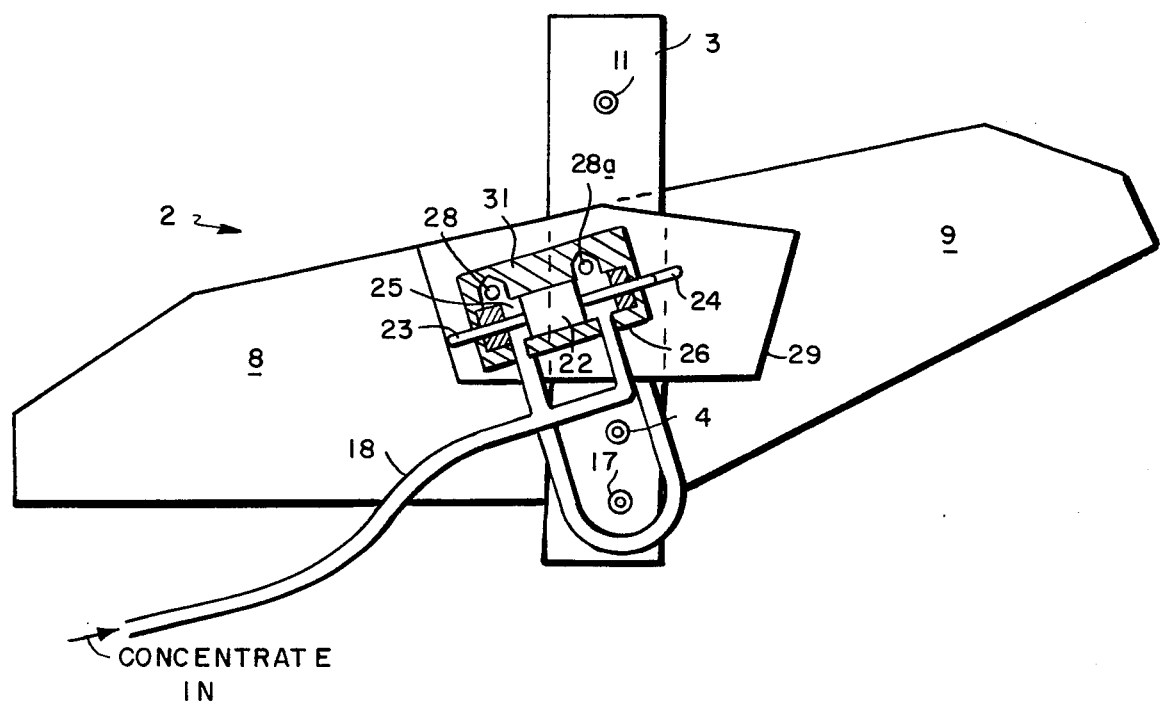
FIG. 4 is schematic side view, partly in section, of an alternative embodiment of the present invention.

FIG. 4 shows a further alternative embodiment, device 2, where the material arrangement is a double-acting single-piston and cylinder pump, mounted in a cylinder block (31) linked to the pan, and having a horizontal axis above the pivot (4) about which the pan pivots. The pump comprises a single piston (22), with piston rods (23,24) extending from each end of the piston, and a single cylinder divided into two chambers (25,26) by the piston, each chamber being capable of receiving and discharging quantities of concentrate. The two chambers at either end of the cylinder are connected to a common supply line for the concentrate (18) and the chamber outlets (28,28a) are connected to two discharge pipes which extend through the side wall of the pan into their respective compartments (8,9). There is also provided a piston-rod stop plate (29) linked to the pan support which limits the movements of the pump and actuates the operation of the piston whilst the device is in motion. The arrangement of the pump is such that when one chamber is discharging the concentrate into the pan the other is receiving concentrate from the supply line and concentrate is delivered to that one of the two compartments of the pan which is about to be filled with diluent. Once a compartment of the pan becomes full, the pan and pump assembly tips over, and the piston rod on the side of the pump which is filling, comes in contact with the piston rod stop plate, and the piston is pushed down the cylinder forcing concentrate from the chamber at the opposite end of the cylinder into the other compartment of the pan, which has now been presented for filling. Diluent then fills the pan, the pan and pump assembly tips over, and the sequence is repeated.

In each of the devices described in FIG. 1 and FIG. 4, the distance of the axis 17 from the axis 4 may be adjusted to vary the stroke of the pistons so as to achieve a desired ratio of water and concentrate. In addition, in each of the devices there may be lost motion or similar connection between the pumps or pump and the pan so that the compartment being filled has already started to tip before one or other of the pumps is operated. This may be of advantage e.g. where the liquid to be metered is viscous and therefore difficult to pump.

The rate of replenishment of the tank 6, may be adjusted by altering the rate of supply of water from the discharge pipe 11 by means of a control valve (not shown) so that the rate of replenishment equals the rate at which the dip solution is removed by the sheep passing through it. Typically, each sheep will remove about ½ gallon of solution. By this means it will be appreciated that the device can operate continuously. Alternatively in use the rate of replenishment of the tank 6, can be adjusted by altering the rate of supply of water from the discharge pipe 11 by means of a float operated valve which senses the level of the liquid in the tank 6.

When the level of liquid in the tank 6, falls below the desired level, the water supply from discharge pipe 11 is activated, and the device set in motion so that the liquid in the tank 6, is raised to its desired level with concentrate/diluent mixture.

When the desired level of liquid is achieved the water supply is turned off by the action of the float operated valve and the device inactivated so that no further concentrate/diluent mixture is transferred into the tank. By this means the level of liquid in the tank is maintained at a constant level.

What is claimed is:

1. A device for replenishing an animal dipping tank with a mixture of first and second liquids, the device comprising, a first inlet for the first liquid; a second inlet for the second inlet, said second inlet comprising a pump having at least one cylinder, piston and piston rod; a two-compartment rocking pan mounted for reciprocal rocking movement between first and second positions about an axis located below the top of the compartments, the first position being such that a first said compartment receives the first liquid and the second position being such that the second said compartment receives the first liquid, said rocking movement being effected by the successive filling of the said two compartments and being such as to empty at least partially the compartment which has just been filled; the pump being mounted to rock in consonance with the rocking pan and the piston rod of said pump being struck against a stop by each reciprocation of the rocking pan such that a measured quantity of the second liquid is ejected from the pump into the said compartment about to receive the first liquid.

2. A device for replenishing an animal dipping tank comprising, in combination, a dipping tank, a rocker mounted astride the dipping tank, a pan mounted to the rocker comprising compartments movable by the rocker from a first position to receive a first fluid to a second position to discharge said first fluid, a conductor positioned above the pan to deliver said first fluid into the compartments at their first positions, said conductor being positioned transversely of the pan at mid-length thereof, said movement being effected by the successive filling of said two compartments and being such as to empty at least partially the compartment which has just been filled and means for delivering a second fluid into the respective compartments, the operation of which is timed to deliver the second fluid into the compartment into which the first fluid is being delivered while the mixed first and second fluids are being discharged from the other compartment, comprising pump means positioned adjacent one side of the pan, said pump means including a piston and piston rods protruding from the opposite ends thereof and stops, said pump means being mounted to the pan so as to be moved in consonance with the pivotal movement of the pan about the pivot axis thereof and said stops being so located that pivotal movement of the pump means engages the piston rods with the stops and wherein engagement of the piston rods with the stops operates to actuate the pump means to alternately deliver a predetermined quantity of the second fluid to the respective chambers.

* * * * *